Jan. 2, 1962    A. BUCHI    3,015,323
FOUR-STROKE INTERNAL COMBUSTION ENGINE
Filed May 12, 1958    3 Sheets-Sheet 1
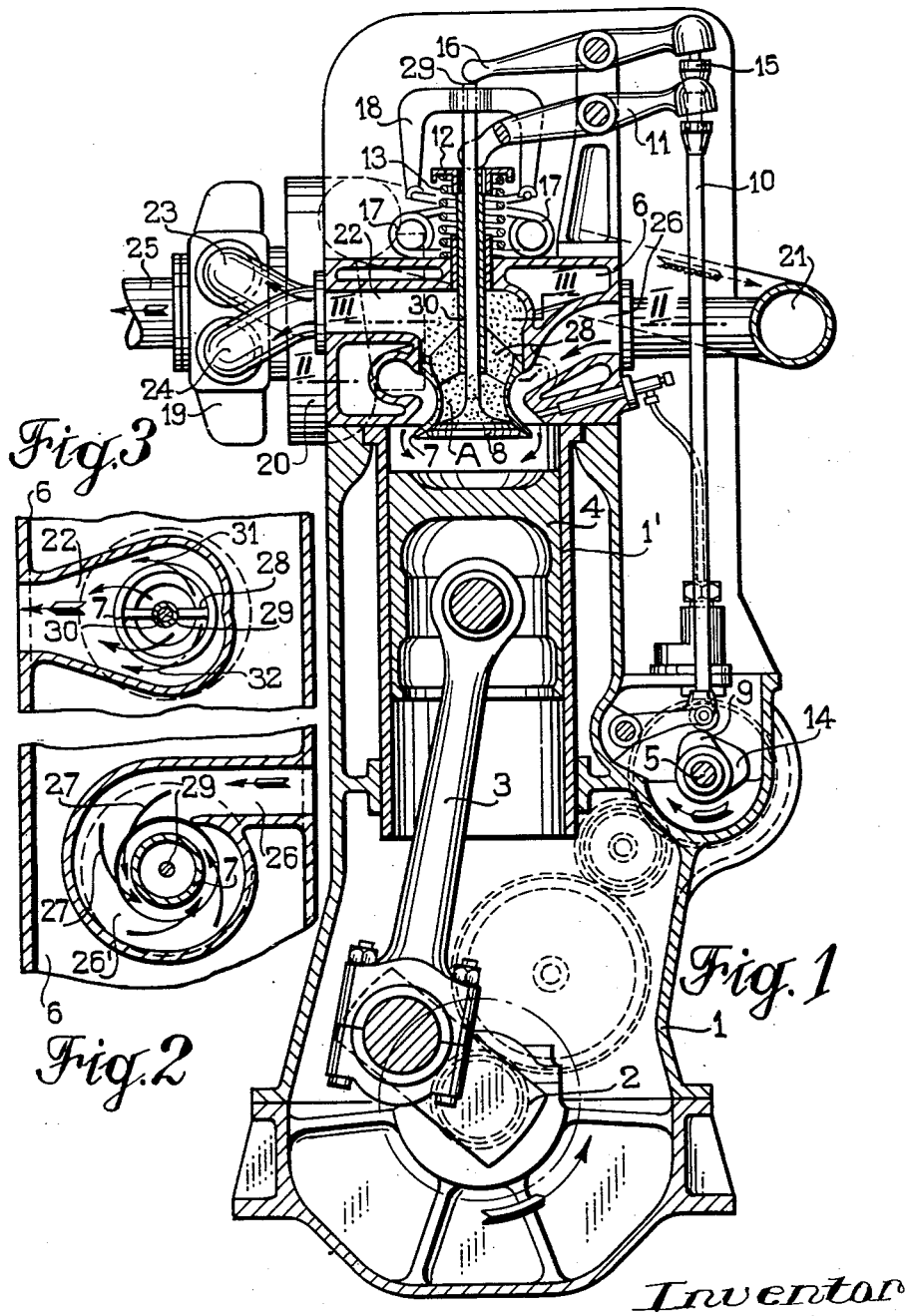
Inventor
A. Buchi
By Kesent Downing Liebell
Attys.

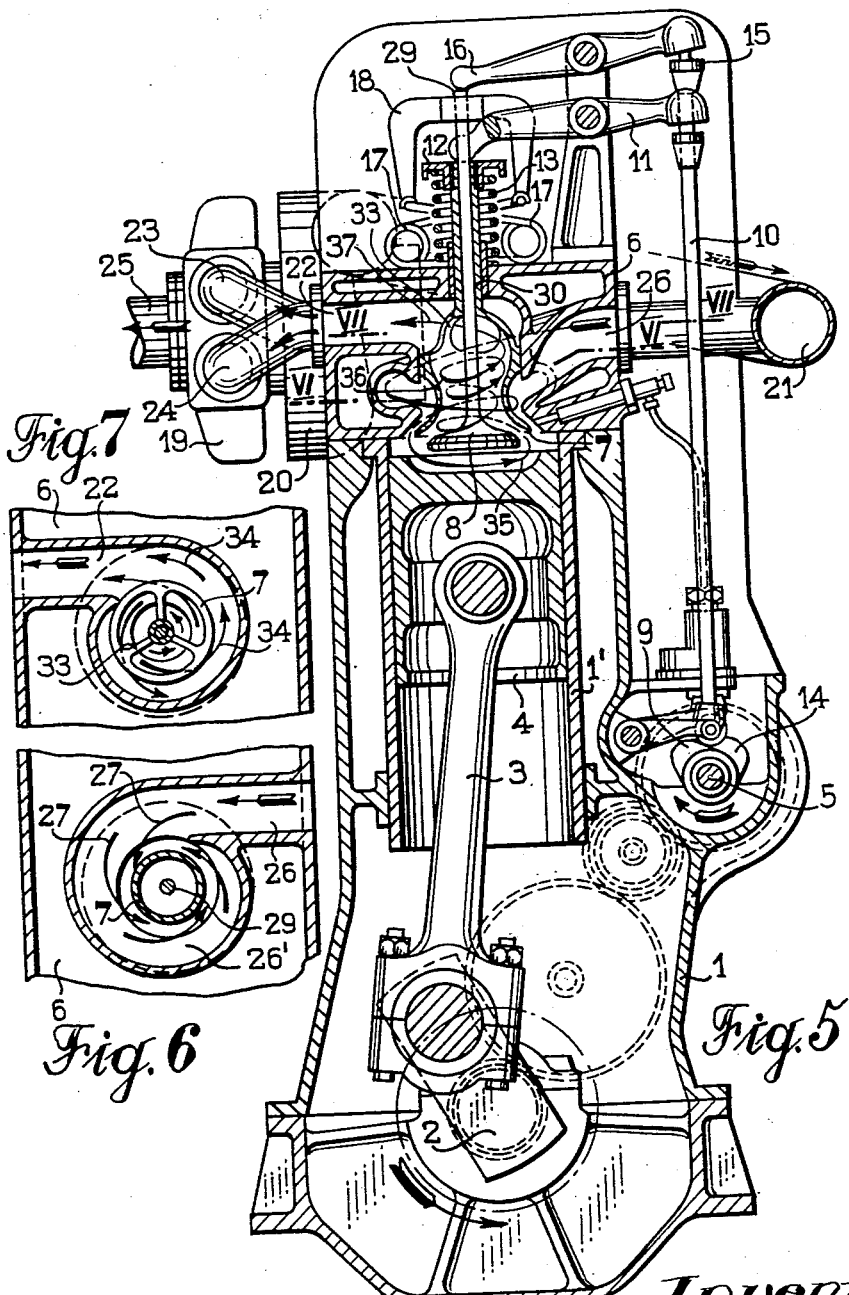

Jan. 2, 1962  A. BUCHI  3,015,323
FOUR-STROKE INTERNAL COMBUSTION ENGINE
Filed May 12, 1958  3 Sheets-Sheet 3
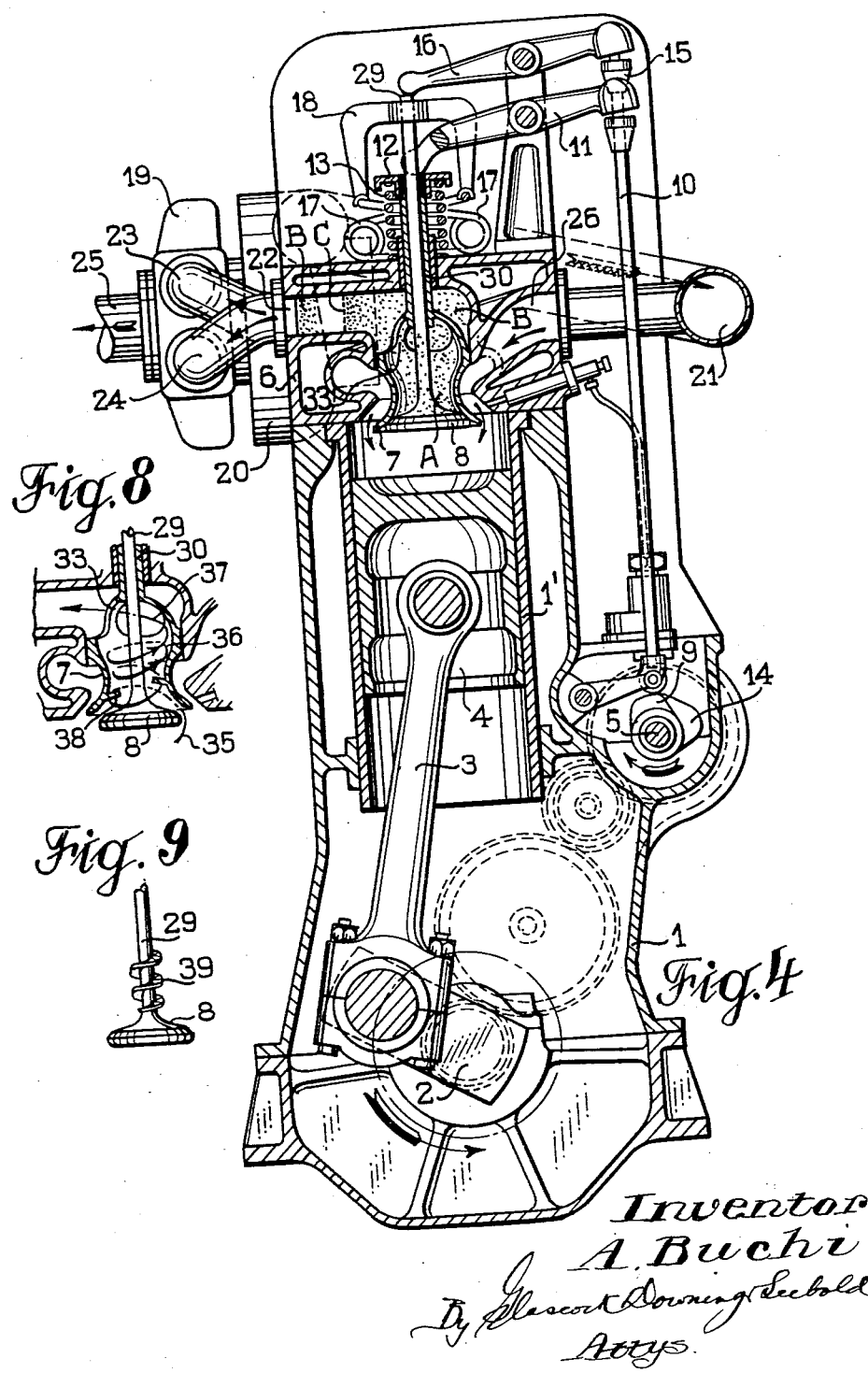
Inventor
A. Buchi
By Escort Downing Seebold
Attys.

3,015,323
FOUR-STROKE INTERNAL COMBUSTION ENGINE

Alfred Buchi, Hurden, Switzerland; Hermann Walder, executor of said Alfred Buchi, deceased, assignor to Ingenieurbureau D.-Ing. Alfred J. Buchi A.G., Winterthur, Switzerland, a Swiss company
Filed May 12, 1958, Ser. No. 734,667
Claims priority, application Switzerland June 19, 1957
4 Claims. (Cl. 123—79)

This invention relates to scavenged four-stroke internal combustion engines comprising an inner exhaust valve positioned concentrically in an outer inlet valve in the cylinder head.

According to the present invention, the valve gear for actuating the valves for scavenging and charging the engine and the scavenging device itself are so arranged that, in addition to the combustion chamber in the cylinder, at least the space between the exhaust valve and the inlet valve on the closure side of the inlet valve is emptied of exhaust gases and scavenged during scavenging of the cylinder. This ensures that the two valves, which are heated by the exhaust gases leaving the cylinder, are cooled during the scavenging phase, and that the space between the valves remain filled with relatively cool air following closure of the exhaust valve and until the start of the following exhaust phase of the operating cycle. This cooling of the valves is enhanced if the exhaust valve closure time is relatively long since the scavenged air between the valves prevents hot exhaust gases from re-entering the space between the valves, such as may occur, for instance, where the exhaust gases are supplied under pressure to a turbine. Also, the actuation of the inlet valve and exhaust valve can be so arranged that, in addition to the compression chamber in the engine cylinder, the whole space between the valves and also the conduit which conveys the gases from said valves are at least partly scavenged, and the said chamber and said conduit which conveys the gases from said valves are at least partly scavenged, and the said chamber and said therefore cooled more satisfactorily during scavenging be- until the next exhausting operation. The two valves are therefor cooled more satisfactorily during scavenging be- cause more scavenging air flows through the space be- tween them. Such cooling continues after the end of scavenging and the arrangement provides a further pro- tection against re-entry of exhaust gases into the space between the valves and a space downstream of the two valves from an exhaust pipe under pressure, more particu- larly when the engine is delivering to a pulse-operated ex- haust gas turbine. The space between the inlet valve and exhaust valve can also be so shaped, that is, provided with guiding surfaces, that the scavenging air entering the said space during scavenging is rotated, whereby cooling of the inlet valve and exhaust valve is increased by the scavenging air travelling helically over a relatively long path. Means for rotating the scavenging air and possibly the charging air can also be provided before the entry to the inlet valve, such means rotating the scavenging air in the same direction both within the combustion chamber near the inlet valve and at least in the space between the inlet and exhaust valve, in such manner that the inlet valve is cooled outside and inside and the exhaust valve is cooled over a long helical path. Advantageously, the scavenging air is rotated at such a rate as to circle, for instance, a number of times in the space before and be- tween the two valves during the scavenging phase. The valves are therefore cooled to a greater extent and for a long period.

According to a feature of the invention, the exhaust pipe leading from the space between the inlet valve and exhaust valve to the exterior can be disposed eccentrically in relation to the exhaust valve axis in such a manner that rotation of the scavenging air around the valve axis, is initiated or increased in the space between the inlet valve and the exhaust valve. A spiral transition chamber may be provided between the inter-valve space and said exhaust pipe. Such an arrangement will increase the scavenging and cooling effect in the space between the two valves and on the two valves or downstream of the two valves.

Means may be built, for instance, inside the inlet valve member or outside the exhaust valve stem, to increase the cooling surfaces for the scavenging air or to rotate the air in the inter-valve space during the scavenging phase.

The ribs between the flow apertures for the exhaust gases and for the scavenging air in the inlet valve member, through which apertures the gases flow to the exterior, can be so shaped or directed as to initiate or assist rotation around the valve axis in the latter apertures.

It is not material how the scavenging air is supplied to the engine. Thus, the scavenging air may be supplied by a pump or blower driven by the engine or by other means or by an exhaust gas turbo-blower driven by the engine exhaust gases.

Practical applications of the invention will now be described, by way of example only, with reference to the accompanying drawings whereof:

FIGS. 1 to 3 illustrate one application,
FIG. 4 illustrates a second application,
FIGS. 5, 6 and 7 illustrate a third application, and
FIGS. 8 and 9 show how the result produced by the arrangement illustrated in FIGS. 5 to 7 can be produced in a different manner.

In FIG. 1, which is a vertical sectional view through one cylinder of an internal combustion engine according to the invention, the reference 1 denotes a cylinder block, 1' a cylinder liner, 2 a crankshaft, 3 a connecting rod, 4 a piston and 6 a cylinder head. The inlet valve 7 and the exhaust valve 8, which is concentric of the inlet valve 7 and moves therein, are disposed in the cylinder head 6. The inlet valve 7 is opened by means of the inlet valve cam 9 which is on a camshaft 5 and which operates a push-rod 10, rocker arm 11 and valve retainer 12, the inlet valve being closed by the spring 13. The exhaust valve 8 is opened by the exhaust valve cam 14 which is fitted to the camshaft 5, the cam actuating push-rod 15 and rocker arm 16. The valve is closed by means of a double hairpin spring 17 and fork lever 18. The engine is also provided with a supercharger 20 which is driven by an exhaust-gas turbine 19 and which supplies scavenging and charging air to the inlet valve 7 through a conduit 21 and conduit 26 in a casing (FIG. 2). When the exhaust valve 8 is open, the engine exhaust gases pass into an exhaust duct 22 and thence into an inlet 24 of the exhaust gas turbine 19. As is apparent from FIG. 1, the turbine 19 has two inlets 23 and 24 through which groups of engine cylinders so exhaust to the turbine 19 that the exhausting operations of individual cylinders do not disturb scavenging operations in the other cylinders, in the manner known from Buchi exhaust gas turbo-supercharging. This is of great advantage in the case of pulse-operated exhaust gas turbines. The gases leave the turbine 19 through the conduit 25. The scavenging phase with this engine begins at substantially 50° before top dead center and terminates about 50° after top dead center. This feature will be apparent from FIG. 1 because the exhaust valve 8 is closed on the still open inlet valve 7. This is apparent from the shape of the inlet valve cam 9, exhaust valve cam 14 and the corresponding position of the crankshaft 2 and camshaft 5.

The invention is applicable to a multi-cylinder engine in which the exhaust gas conduit means of each cylinder is in communication with the exhaust conduit means of at least one other cylinder of the engine and exhausts to an exhaust gas turbine. The invention resides on one hand in the construction of the exhaust gas driven supercharger so as to increase the quantity of scavenging air, and on the other hand by the construction of the valve actuating gear to increase the time of overlap of the valves. The back-pressure before the turbine 19, due to the exhaust pressure in another cylinder of the engine exhausting to the same exhaust pipe during the scavenging period of the cylinder under consideration may fill the exhaust branch pipe to the common exhaust pipe of the cylinder under consideration with exhaust gas from said other cylinder. By increasing the quantity of scavenging air so that at least the space between the valves remains full of cool air (during the charging, compression and expansion phases) hot exhaust gases from another cylinder or reflected from the exhaust gas turbine cannot enter the space "A" between the two concentric valves. The space "A" between the two valves 7 and 8 which is filled with scavenging air is indicated in FIG. 1 by dots.

FIG. 2 is a sectional view, taken along the line II—II of FIG. 1, through the cylinder head 6, and FIG. 3 is a sectional view, taken along the line III—III, through the cylinder head 6.

FIG. 2 shows how the scavenging and charging air flows through the conduit 26 from the conduit 21 into the cylinder head 6. The continuation 26' of the conduit 26 surrounds the inlet valve 7 in spiral arrangement so that the entering scavenging and charging air is rotated around the inlet valve 7 as indicated by arrows 27. Since the inlet valve 7 has internal ribs 28 and a hub 30 extending around the exhaust valve stem 29, in accordance with FIGS. 1 and 3, the gases flow between the two valves over the valve ribs 28 into the exhaust pipe 22, as indicated by arrows 31, 32 in FIG. 3. Of course, the inlet valve 7 could be provided with more than the two ribs 28 shown in the drawings.

In FIGS. 2 and 3, the bolts for fixing the cylinder head 6 to the cylinder block 1 are not shown for the sake of clarity.

FIG. 4 is a vertical sectional view through one cylinder of an internal combustion engine according to the invention. The scavenging period of the engine shown in FIG. 4 is longer than the scavenging period of the engine shown in FIGS. 1 to 3 and starts at approximately 60° before top dead center and finishes approximately 60° after top dead center. The inlet valve 7 and outlet valve 8 are also differently designed. The inlet valve 7 has a domed top part through which the gases issue to the conduit 22 and thence to the exhaust gas turbine 19, and the space in the dome between the inlet valve 7 and the exhaust valve 8 has no elements impeding the gas flow as was the case in FIG. 1. The valve stem 29 of the exhaust valve 8 freely extends through the inner space of the dome. In this case, the exhaust gas turbo-supercharger 19, 20 is designed to supply more scavenging air to the internal combustion engine than is the case in the engine of FIG. 1. The quantity of scavenging air provided by the supercharger 20 for the cylinder is such that, in addition to the space A between the inlet valve and exhaust valve, the space B downstream of the valves is emptied of exhaust gases and filled with scavenging air. The region in which retention of scavenging air in the spaces A and B occurs after the end of the scavenging phase, that is, when the exhaust valve 8 is closed, is indicated by dots in FIG. 4.

While the scavenging air is flowing through and around the space A, at least the inner walls of the domed inlet valve 7, the ribs 33, its valve stem 30, the exhaust valve 8 and the stem 29 thereof are effectively cooled. Cooling continues after the exhaust valve 8 has closed on the inlet valve 7, for the reason that at least in the space A scavenging air is retained for a relatively long period—i.e. during the additional inlet stroke, and the compression, combustion and expansion strokes until the beginning of the subsequent exhaust phase. Hence for three-quarters of one whole cycle there is scavenging and cooling or cooling alone and only for about one-quarter of the cycle are the valves heated by the exhaust gases. With a design such as shown in FIG. 4, however, at least the conduit part 22 downstream of the inlet valve dome is scavenged and cooled during the scavenging phase, as indicated by the dots B. The scavenging air remains in the conduit 22 after the exhaust valve has closed and cools the space behind the inlet valve 7, the stem 30 thereof and the walls of the conduit 22. If the supercharging is so designed that the exhaust gas turbine 19 operates on pressure pulses of the exhaust gases entering it from the cylinder, the scavenging air retained in the space 22 can be compressed, for instance, as far as the line C during the pressure pulses. To this end, the exhaust valve 8 closes on the inlet valve 7 later than in the case shown in FIG. 1 in order to increase the scavenging phase, for not only the space A but also the space B must be scavenged and remain filled with relatively cool scavenging air after closure of the exhaust valve 8.

It should preferably be ensured that at least this effect results in the whole inlet valve and its top guide being surrounded by scavenging air during the pressure pulses.

FIG. 5 is a similar view to FIGS. 1 and 4, being a vertical section through one cylinder of an internal combustion engine according to the invention, like elements having like references. The crank of the crankshaft 2 is at 30° after top dead center and the positions of the inlet valve 7 and exhaust valve 8 are those associated with the scavenging phase. A domed inlet valve 7 is provided, the exhaust valve stem 29 being guided only in the top valve stem 30 of the inlet valve 7.

FIG. 6 is a sectional view, taken along the line VI—VI of FIG. 5, through the cylinder head 6, inlet valve 7 and exhaust valve stem 29. The scavenging and charging air enters the cylinder head at 26. The continuation 26' of the conduit 26 spirals around the inlet valve 7 so that the scavenging and charging air passing there-through to the inlet valve 7 is rotated in the direction indicated by arrows 27.

FIG. 7 is a sectional view taken along the line VII—VII of FIG. 5—i.e., through the exhaust pipe 22 and through the gas exit space above the dome of the inlet valve 7. The exhaust pipe 22 is eccentric of the common valve axis. The space which lies around the domed part of the inlet valve 7 and through which the exhaust gases flowing between the two valves pass into the exhaust pipe 22 is spiral, so that a rotation is produced therein in the direction indicated by arrows 34. The conduit 22 is so disposed as to produce, by itself and by means of the initially spiral form of its collector, a rotation around the valve axis corresponding to the arrows 34 and in the same direction as the rotation of the scavenging and charging air entering through the inlet valve 7. A rotation of the gases is thus initiated or increased in the space between the inlet valve 7 and exhaust valve 8, thus increasing the cooling thereof. If the rate of eddying is high as compared with the speed along the longitudinal axis of the valves, the path of the scavenging air between the two valves is lengthened considerably, thus further improving cooling. The arrows 35, 36, 37 in FIG. 5 indicate the behavior of the eddies before and after the inlet valve and between the two valves. Of course, these eddies of scavenging air are advantageous for the dome of the inlet valve, its ribs 33, its valve stem 30 and all the conduit parts 22 which are nearby and which convey exhaust gases.

FIG. 8 again shows as a variant, an inlet valve 7 and an exhaust valve 8 in their positions during the scavenging phase. In this design, which also provides eddying between the inlet valve and exhaust valve, eddying is produced by the provision of a helical guide rib 38 in the inlet valve 7.

FIG. 9 illustrates another variant, that is, only the exhaust valve 8 has helical guide ribs 39 on its stem 29. The guide ribs cool the valve during the scavenging phase by means of their relatively large surfaces. If they are helical guide ribs as shown, they will also rotate the scavenging air around the valve stem 29. The path of the scavenging air will thus be increased and cooling further improved. Cooling of the exhaust valve 8 and its stem 29 are further improved by such cooling ribs during the long filling of the space between the two valves with scavenging air.

What I claim is:

1. In a supercharged four-stroke internal combustion engine having a cylinder head, an inlet valve seated in the cylinder head, an exhaust valve arranged concentrically within the inlet valve with the opening periods of said inlet and exhaust valves overlapping a certain time, said inlet valve having wall means and said wall means defining a space between the inlet and exhaust valves, said wall means being provided with through-flow openings for the exhaust gas controlled by the outlet valve, means defining a spirally formed inlet duct around said wall means for the admission of charging and scavenging air tangentially and for rotation of the scavenging air in said space between the inlet and exhaust valves, means defining a chamber around the through-flow openings, means defining an exhaust duct, and means tangentially connecting the exhaust duct to the chamber whereby the rotation during the scavenging cycle in said space between the inlet and exhaust valves is intensified and after scavenging of the gas, relatively cool scavenging air is maintained in the space between the inlet and exhaust valves for intensified cooling of said inlet and exhaust valves.

2. The supercharged, four-stroke, internal combustion engine as claimed in claim 1, wherein said chamber is spirally formed around the through-flow openings in the wall means.

3. The supercharged, four-stroke, internal combustion engine as claimed in claim 1, further including spiral guide ribs on the interior of the wall means of said inlet valve.

4. The supercharged, four-stroke, internal combustion engine as claimed in claim 1, further including a stem for the exhaust valve and helical guide ribs on said stem.

References Cited in the file of this patent

UNITED STATES PATENTS

| 2,213,202 | Buchi | Sept. 3, 1940 |
| 2,670,594 | Crooks | Mar. 2, 1954 |

FOREIGN PATENTS

| 22,950 | Great Britain | Oct. 17, 1906 |

OTHER REFERENCES

High Speed Diesel Engines (pages 129 and 130), 5th edition, Chapman and Hall, Ltd., 1957.